United States Patent Office 3,808,231
Patented Apr. 30, 1974

3,808,231
4-[2-HYDROXY-3-(2-ALKYNYLAMINO)
PROPOXY]INDOLES
Fritz Seemann, Basel, and Franz Troxler, Bottmingen, Switzerland, assignors to Sandoz Ltd., Basel, Switzerland
No Drawing. Filed Jan. 4, 1972, Ser. No. 215,430
Claims priority, application Switzerland, Jan. 7, 1971, 184/71
Int. Cl. C07d 27/56
U.S. Cl. 260—326.15           3 Claims

ABSTRACT OF THE DISCLOSURE

This invention concerns new heterocyclic compounds of the formula:

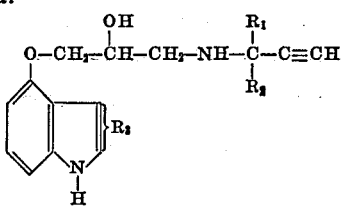

wherein $R_1$, $R_2$ and $R_3$ are the same or different and are each hydrogen or methyl,
which exhibit pharmacological properties, and are useful as adrenergic β-receptor blocking agents and antiarrhythmic agents.

---

This invention relates to new heterocyclic compounds.
In accordance with the invention there are provided compounds of Formula I,

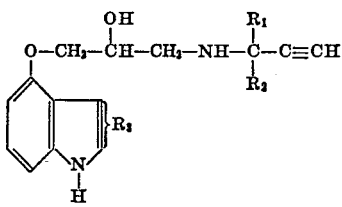

wherein $R_1$, $R_2$ and $R_3$ are the same or different and are each hydrogen or methyl.

Further, in accordance with the invention a process for the production of a compound of Formula I comprises reacting a compound of Formula IIa,

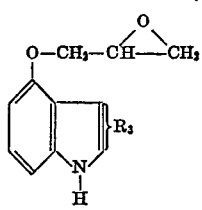

wherein $R_3$ is as defined above,
or a compound of Formula IIb,

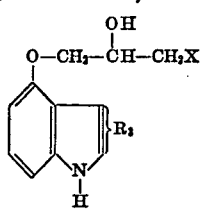

wherein
$R_3$ is as defined above, and
X is fluorine, chlorine, bromine or iodine, preferably chlorine or bromine, or a mixture of a compound of Formula IIa with a compound of Formula IIb, hereinafter referred to as compounds of Formula II, with a compound of Formula III,

wherein $R_1$ and $R_2$ are as defined above.

The compounds of Formula I exist and may be isolated in free base or acid addition salt form. Conversion from one form to another may be effected in manner known per se.

The reaction of a compound or compounds of Formula II with an amine of Formula III may, for example be effected in an inert organic solvent, e.g. an aromatic hydrocarbon such as benzene or toluene, or in a cyclic ether such as dioxane or tetrahydrofuran, and has a duration of approximately 2 to 24 hours.

The reaction may be effected at a temperature between 20 and 150° C.; it is preferably effected under reflux.

The resulting compounds of Formula I may be worked up and purified in accordance with known methods.

The compound of Formula II are known and may, for example, be obtained by reacting the corresponding 4-hydroxyindole, as a salt or in the presence of a base, with an epihalohydrin.

Since epihalohydrin molecules have two reactive sites, a mixture of compounds of Formulae IIa and IIb is obtained, the composition of which is dependent on the reaction conditions. However, when the process of the invention is used, both types of compounds yield the same final product, so that it is not necessary to effect a separation of the mixture and the mixture may be used as such, without further purification, in the next reaction stage, although separation may be readily effected, e.g. by chromatography.

Insofar as the production of the starting materials is not particularly described, these are known or may be produced in accordance with known processes or in a manner analogous to the process described herein or to known processes.

The compounds of Formula I have hitherto not been described in the literature. They are useful because they possess pharmacological activity in animals. In particular the compounds are useful adrenergic β-receptor blocking agents and antiarrhythmic agents, as indicated by an inhibition of the positive inotropic adrenalin effect in the spontaneously beating, isolated guinea pig atrium, and an inhibition of the tachycardia and hypotension caused by isoproterenol [1-(3,4-dihydroxyphenyl)-2-isopropylaminoethanol] in the narcotized animal (cat).

For the abovementioned use the dosage administered will naturally vary depending on the compound used, the mode of administration and the treatment desired. However, in general, satisfactory results are obtained in test animals when administered at a daily dosage of from about 0.02 to 0.6 mg./kg. animal body weight, preferably given in divided doses of from about 0.006 to 0.3 mg./kg. animal body weight or in retard form. For larger mammals, the total daily dosage is in the range of from about 10 to 100 mg., and unit dosages suitable for oral administration comprises from about 3 mg. to about 100 mg. of one of the compounds admixed with a solid or liquid pharmaceutical carrier or diluent.

The free base and pharmaceutically acceptable acid addition salt forms possess the same type of activity. Examples of acids suitable for pharmaceutically acceptable acid addition salt formation are inorganic acids, e.g. hydrochloric acid, and organic acids, e.g. methane sulphonic acid.

A preferred compound is 4-[2-hydroxy-3-(2-methyl-3-butin-2-ylamino)propoxy]indole.

In the following non-limitative example all temperatures are indicated in degrees centigrade and are uncorrected.

EXAMPLE

4-[2-hydroxy-3-(2-methyl-3-butin-2-ylamino)propoxy]indole 11.2 g. of 4-(2,3-epoxypropoxy)indole, 6.2 g. of 3-amino-3-methylbutine-1 and 30 cc. of dioxane are heated to the boil for 20 hours. The reaction mixture is evaporated to dryness at reduced pressure, the evaporation residue is extracted between ethyl acetate and 1 N tartaric acid, and the combined tartaric acid phases are made alkaline with caustic soda solution while cooling. The resulting precipitate is filtered off, washed with water, dried, and this crude product is recrystallized from ethyl acetate. The title compound in free base form has a M.P. of 150–152°.

What is claimed is:

1. A compound of the formula:

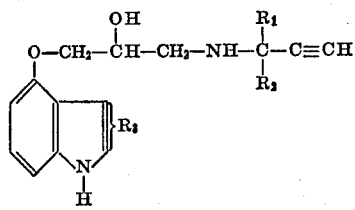

wherein $R_1$, $R_2$ and $R_3$ are the same or different and are each hydrogen or methyl.

2. The compound of claim 1, which is 4-[2-hydroxy-3-(2-methyl-3-butin-2-ylamino)propoxy]indole.

3. A pharmaceutically acceptable acid addition salt of the compound of the formula

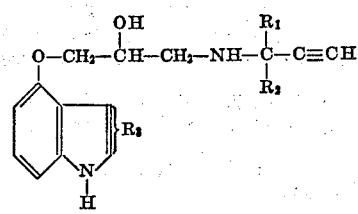

wherein $R_1$, $R_2$ and $R_3$ are as defined in claim 1.

References Cited

UNITED STATES PATENTS 3,705,907   12/1972   Troxler ---------- 260—326.14

JOSEPH A. NARCAVAGE, Primary Examiner

U.S. Cl. X.R.

424—274